(12) United States Patent
Good, III et al.

(10) Patent No.: US 9,803,449 B2
(45) Date of Patent: Oct. 31, 2017

(54) PIN-LESS COMPOSITE SLEEVE OR COUPLING TO COMPOSITE MANDREL OR SHAFT CONNECTIONS

(71) Applicant: CCDI COMPOSITES INC., Santa Ana, CA (US)

(72) Inventors: Frederick A. Good, III, Marina Del Rey, CA (US); Dennis E. Sherlin, Hacienda Heights, CA (US); Jack A. Shippy, Brea, CA (US)

(73) Assignee: CCDI Composites Inc., Santa Ana, CA (US)

( * ) Notice: Subject to any disclaimer, the term of this patent is extended or adjusted under 35 U.S.C. 154(b) by 703 days.

(21) Appl. No.: 13/912,074

(22) Filed: Jun. 6, 2013

(65) Prior Publication Data

US 2013/0327517 A1 Dec. 12, 2013

Related U.S. Application Data

(60) Provisional application No. 61/656,119, filed on Jun. 6, 2012.

(51) Int. Cl.
*E21B 33/12* (2006.01)
*B32B 7/12* (2006.01)
*B32B 1/08* (2006.01)

(52) U.S. Cl.
CPC ............... *E21B 33/12* (2013.01); *B32B 1/08* (2013.01); *B32B 7/12* (2013.01); *B32B 2307/54* (2013.01); *Y10T 156/1062* (2015.01); *Y10T 156/1064* (2015.01)

(58) Field of Classification Search
CPC .... E21B 33/12; E21B 33/1204; E21B 33/134; B32B 1/08; B32B 7/12; B32B 2307/54; Y10T 156/1064; Y10T 56/1062
USPC .................................................. 166/193, 192
See application file for complete search history.

(56) References Cited

U.S. PATENT DOCUMENTS

| | | | | |
|---|---|---|---|---|
| 3,062,568 | A * | 11/1962 | Andresen et al. ............ 285/333 |
| 5,224,540 | A * | 7/1993 | Streich et al. ................ 166/118 |
| 5,271,468 | A * | 12/1993 | Streich et al. ................ 166/387 |
| 5,390,737 | A * | 2/1995 | Jacobi et al. ................. 166/184 |
| 8,267,177 | B1 * | 9/2012 | Vogel et al. .................. 166/317 |
| 2011/0079383 | A1 * | 4/2011 | Porter et al. .................. 166/118 |
| 2011/0132486 | A1 * | 6/2011 | Martin ................ E21B 17/042 138/177 |
| 2011/0259610 | A1 * | 10/2011 | Shkurti et al. ............... 166/386 |

* cited by examiner

*Primary Examiner* — Blake Michener
(74) *Attorney, Agent, or Firm* — Klein, O'Neill & Singh, LLP

(57) ABSTRACT

Methods, devices, and systems of downhole tools are disclosed. The tools each has a sleeve attached to a mandrel to form a composite frac or bridge plug or similar coupling to a downhole tool tubing product without the use of shear pins. The engagement between the mandrel and the sleeve includes a load breaking ledge, threads, ring and groove combination, and helical spiral groove with a helical coil.

20 Claims, 3 Drawing Sheets

PIN-LESS COMPOSITE SLEEVE OR COUPLING TO COMPOSITE MANDREL OR SHAFT CONNECTIONS

FIELD OF ART

The present disclosure is directed to the field of composite downhole tools, such as composite frac and bridge plugs.

BACKGROUND

In oil and gas well completion operations, frac plugs and bridge plugs are necessary for zonal isolation and multi-zone hydraulic fracturing processes. The advantages of frac and bridge plugs made from composite materials is well established since these products significantly reduce drill-out (removal) time compared to metallic frac and bridge plugs. However, as drilling for oil and gas extends deeper, the composite frac and bridge plugs are expected to sustain higher pressures and operating temperatures. Composites are also being used more frequently in other downhole tools and product applications such as composite pipe and tubing because of better corrosion resistance compared to metals.

A frac plug or bridge plug made of composite materials typically has a central composite tubular mandrel with integral composite sleeves at both ends to restrain the functional elements of the plug (slips, cones, gland) so that the assembly both grips the well casing and seals the plug to the well casing. Often, composite sleeves are both bonded and mechanically pinned to the frac or bridge plug mandrel in order to handle operational forces. For high temperature and pressure applications of 350 degrees F. and 10,000 psi (or higher), it has been found that sleeves that are adhesive bonded to central mandrels are sometime not strong enough for the operating range. For this reason, current high performance composite frac and bridge plug products typically have multiple mechanical shear pins along with adhesive to affix the sleeve to the mandrel in order to handle set and fracking pressure loads. These mechanical pins are not only costly to drill and assemble but also provide potential leak sites where the pins are installed. Furthermore, in certain frac and bridge plug products, there is insufficient wall thickness for the tubular mandrel to adequately pin the sleeve to the mandrel.

Adhesive bonding is normally considered an effective way to attach two composite components together, in this case one or more sleeves and a mandrel of a composite frac or bridge plug. However, typical epoxy based adhesives lose strength at elevated temperatures. Frac and bridge plug operating temperatures in the 350 F range become problematic for attaching the sleeves to the mandrel on downhole plugs with only epoxy adhesive. The epoxy adhesive at 350 F for downhole applications has roughly only 40% of the lap shear strength normally achieved at room temperature. It is not always possible to increase the lap shear surface area between the sleeve and the mandrel of a frac or bridge plug due to other design constraints. For this reason, typical frac and bridge plug products often have several shear pins penetrating through the sleeve but not completely through the mandrel. The shear pins are typically ⅜ inch to ½ inch diameter and can be made from composite materials, again to facilitate drilling out the plug after use. The shear pins provide enough shear strength to offset the loss of strength for the adhesive bond at elevated temperature. The shear pins are usually bonded into the assembly when installed.

Other downhole tools and products have a similar engineering problem requiring the connection of a composite or metal sleeve, coupling or end fitting to a composite tubular product. For example, lengths of composite downhole tubing often require a sleeve connection at the ends. The technical challenge to make a reliable and strong connection between the tubing and the end fitting is similar to that of the composite frac and bridge plug.

SUMMARY

Aspects of the present disclosure are directed to frac plugs and bridge plugs. Specific aspects of the present disclosure are directed to apparatus and system involving frac and bridge plugs and to method for using and making frac and bridge plugs. In an example, a composite frac plug, bridge plug or downhole tool is provided, said tool comprising a composite tubular sleeve comprising a lip or shoulder coupled to an inner tubular composite structure comprising a lengthwise bore and a load bearing ledge to transfer some of the shear stress to different laminate layers of the sleeve and of the mandrel to enhance the strength of the connection between the two.

The frac plug, bridge plug or downhole tool wherein the inner tubular composite structure is a mandrel comprising a ball seat.

A further aspect of the present disclosure is directed to a composite frac plug, bridge plug or downhole tool comprising a composite tubular sleeve comprising internal threads coupled to an inner tubular composite structure having a lengthwise bore and external threads with wide base threads tapered to a smaller diameter so that shear stress along the threads is distributed into different layers of the composite sleeve and inner tubular composite structure to enhance the strength of the connection between the two.

A still further aspect of the present disclosure is directed to a composite frac plug, bridge plug or downhole tool comprising a composite tubular sleeve comprising an internal annular groove; an inner tubular composite structure having a lengthwise bore and an annular groove on an exterior surface; the combination internal annular groove and annular groove on the exterior surface define a common groove; a split ring positioned in the common groove for transfering shear load into a bearing load absorbed by the tubular sleeve and the inner tubular composite structure for enhanced strength.

A still yet further aspect of the present disclosure is a composite frac plug, bridge plug or downhole tool comprising a composite tubular sleeve comprising an internal shoulder, an end fitting connected to an inner tubular composite structure comprising a lengthwise bore; said end fitting comprising different inside and outside diameters, a skirt section, and a ball seat; said internal shoulder abutting the skirt section so that shear stress is distributed into multiple layers of the composite tubular sleeve and inner tubular composite structure in tension and some of the shear stress is distributed into a bearing stress deeper in the composite laminate when loaded in compression.

A still yet further aspect of the present disclosure is a composite frac plug, bridge plug or downhole tool comprising a composite tubular sleeve comprising an internal helical groove and an inner tubular composite structure comprising a lengthwise bore and a companion external helical groove; the internal helical groove and external helical groove define a common groove; a metallic, non-metallic, or combination metallic and non-metallic wire positioned in the common groove to apportion some of the overall shear stress into a bearing load distributed into deeper layers of the composite components for enhanced strength.

A still further aspect of the present disclosure is a composite downhole tool. In an example, the downhole tool comprises a tubular sleeve comprising an exterior surface and an interior surface defining a sleeve bore, said tubular sleeve being made from a composite material and comprises a plurality laminate layers including an inner most laminate layer defining, at least in part, the bore and an outer most laminate layer defining, at least in part, the exterior surface; a mandrel comprising an exterior surface and an interior surface defining a lengthwise bore, said mandrel being made from a composite material and comprises a plurality laminate layers including an inner most laminate layer defining, at least in part, the lengthwise bore and an outer most laminate layer defining, at least in part, the exterior surface; and wherein the tubular sleeve is coupled to the mandrel and several laminate layers of the tubular sleeve and several laminate layers of the mandrel abut one another or abut a common component that is not a pin to distribute load across multiple different laminate layers.

The composite downhole wherein the mandrel comprises a ball seat located within the bore of the tubular sleeve.

The composite downhole tool wherein the common component is a split ring.

The composite downhole tool wherein the common component is a spiral wire made from a composite, a metal, or a combination thereof.

The composite downhole tool wherein the several laminate layers of the tubular sleeve define at least part of a plurality of internal threads.

The composite downhole tool wherein the several laminate layers of the mandrel define, at least in part, an annular groove on the exterior surface of the mandrel.

The composite downhole tool wherein the wherein several laminate layers of the tubular sleeve form an internal ledge and the several laminate layers of the mandrel form an outside ledge on the mandrel and wherein the two ledges abut one another.

The composite downhole tool further comprising adhesive applied at an interface of the tubular sleeve and the mandrel.

The composite downhole tool wherein the internal threads are helical internal threads.

The composite downhole tool wherein the sleeve is uninterrupted on the exterior surface with a hole or a bore.

Another feature of the present disclosure is a method for forming a downhole tool. The method comprising forming a composite tubular sleeve with a plurality of laminate layers, said tubular sleeve comprising an exterior surface and an interior surface defining a sleeve bore; forming a cut in the interior surface of the sleeve to expose several laminate layers but no hole or bore on the exterior surface of the sleeve; forming a composite mandrel with a plurality of laminate layers, said composite mandrel comprising an exterior surface and an interior surface defining a lengthwise bore; forming a cut on the exterior surface of the sleeve to expose several laminate layers; coupling the sleeve to the mandrel so that several laminate layers of the tubular sleeve and several laminate layers of the mandrel abut one another or abut a common component that is not a pin to distribute load across multiple different laminate layers.

The method wherein the cut in the interior surface of the sleeve define an annular groove having a split ring located therein.

The method wherein the cut on the exterior surface of the mandrel define an exterior helical thread.

The method further comprising attaching an end cap comprising a ball seat to the mandrel and applying adhesive to the end cap and the sleeve.

The method further comprising placing a helical wire made of a composite, a metal, or a combination of thereof into the exterior helical thread.

The method further comprising a second composite sleeve attached to the mandrel.

The method wherein the cut on the exterior surface of the mandrel define a plurality of course threads.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of sleeve or coupling to mandrel connections provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Aspects of the present apparatus, system, and method provide several options for eliminating shear pins for mandrel to sleeve connections by incorporating other structural features aside from relying solely on the strength of the epoxy adhesive to provide for a stronger sleeve or coupling connection in a composite frac or bridge plug mandrel or other tubular composite downhole product.

Figure 1:
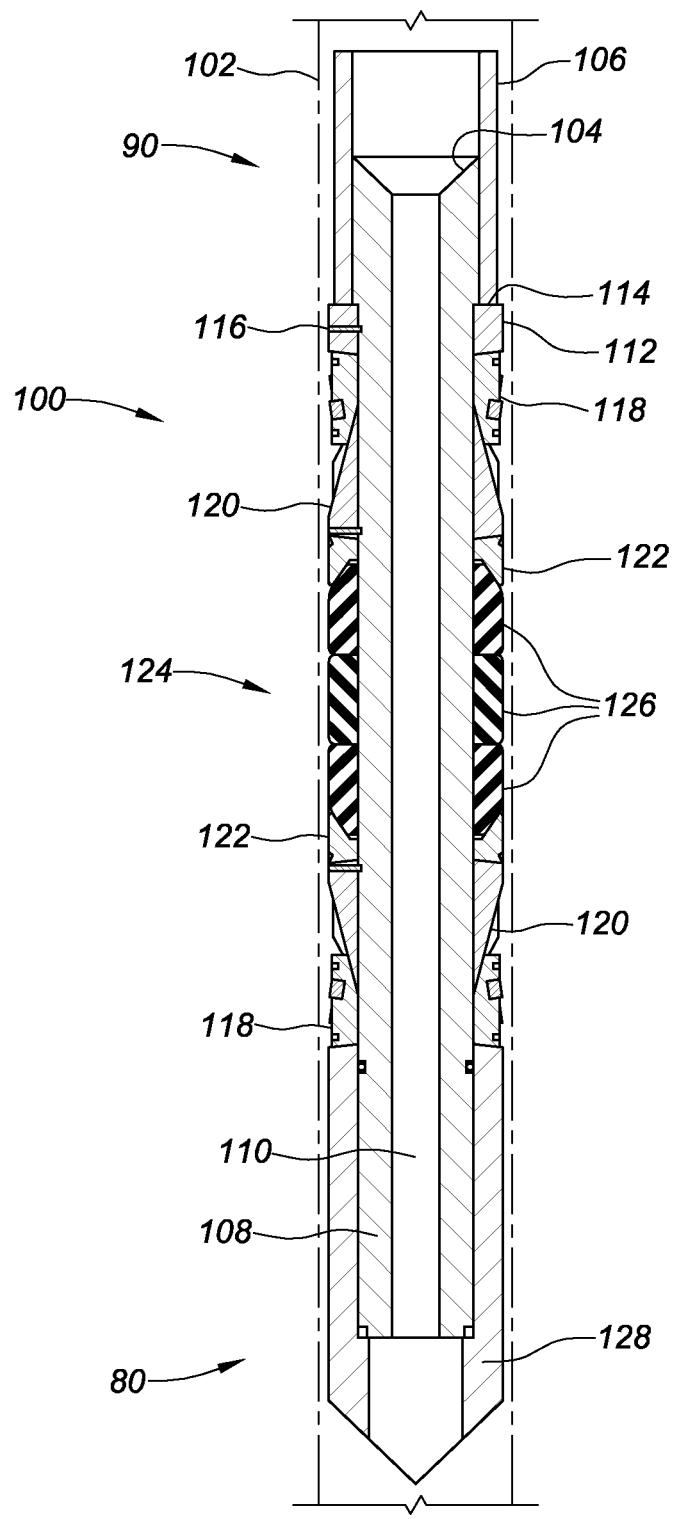
FIG. 1 is a schematic cross-sectional side view of a composite frac plug or bridge plug in accordance with aspects of the present disclosure.

With reference now to FIG. 1, a downhole tool 100 provided in accordance with aspects of the present disclosure is shown situated in a well bore 102, which can be a production casing, an intermediate casing, or a surface casing. The downhole tool 100 is a frac plug system and includes a ball seat 104 for receiving a closing ball or frac ball (not shown). However, in other embodiments, the downhole tool can be a bridge plug that utilizes the high strength connection and system of bonding of the present disclosure.

As shown, the tool 100 has a first end 90 and a second end 80 and a mandrel 108 running through the tool. A sleeve 106 is shown attached to the mandrel 108, which has a bore 110 for fluid flow. In one example, the sleeve 106 is attached to the mandrel 108 without any pin, i.e., a pin-less connection, as further discussed below with reference to FIGS. 2-7. In alternative embodiments, one or more pins are used.

A spacer ring 112 is abutted against a shoulder 114 defined by the sleeve 106 and optionally pinned to the mandrel 108 with one or more pins 116. The spacer ring 112 supports a slip back up or slip ring 118, which has a tapered interior surface for riding up against a tapered surface of the slip wedge 120 to bite against the casing when set. A second set of slip wedge 120 and slip ring 118 is provided closer to the second end 80 for gripping the tool assembly 100 against the casing.

A packer shoe 122 is provided adjacent the packer assembly 124, which in the current embodiment has three packer rings 126. In other examples, a different number of packer rings is used, such as one, two, or more than three. The upper and lower packer shoes 122 are configured to compress the packer assembly 124 when the downhole tool 100 is set, which causes the three packer rings 126 to expand outwardly away from the mandrel 108 to seal against the casing.

A nose section 128 is provided at the second end 80 of the downhole tool 100, which may be used to engage a crown (not shown) of another downhole tool. In the present embodiment, the nose section 128 is attached to the mandrel 108 without any pin, i.e., a pin-less connection, similar to the way the sleeve 106 attaches to the mandrel 108. In alternative embodiments, one or more pins are used to secure the nose section 128 and the mandrel in combination with adhesive. In yet other examples, a coupling or another sleeve, similar to sleeve 106, is attached to the mandrel at the second end 80.

Figure 2:
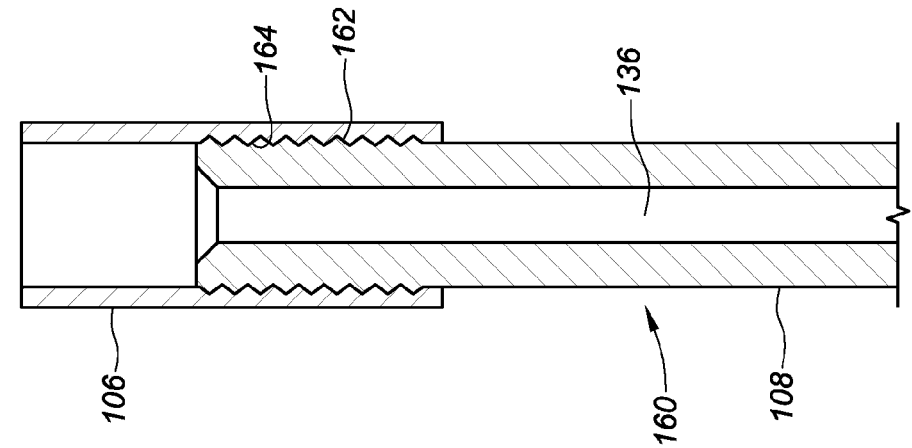
FIG. 2 shows a typical prior art sleeve to mandrel connection comprising a plurality of pins.

With reference now to FIG. 2, a typical prior art sleeve 106 to mandrel 108 connection for a composite frac or bridge plug 130 with shear pins 132 is disclosed. Holes are drilled through the sleeve 106 and partially through the body of the mandrel 108 for receiving the pins. The interface between the sleeve and the mandrel is typically also bonded with adhesive to further secure the two. If the operating temperatures, set loads and pressures for the plug 130 are low enough for adhesive bonding to work satisfactorily by itself, then no pins are required to secure the sleeve to the mandrel.

Figure 3:
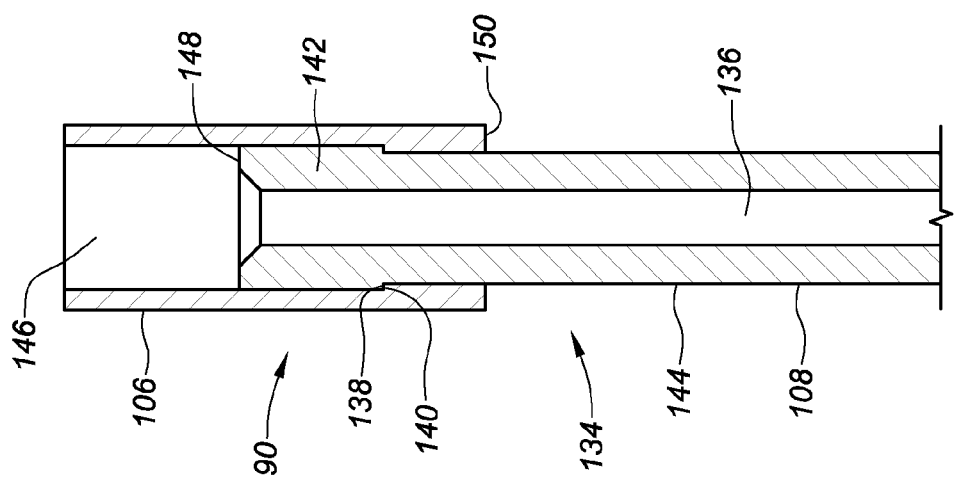
FIG. 3 shows a first alternative downhole tool provided in accordance with aspects of the present disclosure.

With reference now to FIG. 3, a downhole frac or bridge plug 134 is shown comprising a mandrel 108 comprising a bore 136 and a sleeve 106, which are both made from composite materials, such as by forming them from a plurality of laminate layers and adhesive. The plug 134 is also understood to include other plug components, for example other components discussed above with reference to FIG. 1, but are not shown in FIG. 3 for clarity. For example, the plug 134 may comprise another sleeve located at the second end, opposite the first end 90. As shown, a load bearing ledge 138 is formed on the mandrel 108. In one example, the load bearing ledge 138 is formed by applying additional composite layers during fabrication of the mandrel to create an enlarged diameter section 142 that is slightly larger in diameter than the nominal diameter section 144 to define the ledge or shoulder 138 therebetween. The ledge 138 is preferably sharp, i.e., square edge, but a high degree taper is contemplated. The sleeve 106 is similarly provided with a ledge or shoulder 140 for abutting with the ledge 138 on the mandrel. The ledge 140 on the sleeve 106 may be formed by machining the bore 146 of the sleeve. The abutting ledges 138, 140 transfer some of the load to the sleeve mechanically thereby increasing the strength of the lap shear connection. Adhesive may be added to the interface between the sleeve and the mandrel. The distance between the ledge 138 and the upper end 148 of the mandrel and the distance between the ledge 140 on the sleeve 106 and the far end 150 of the sleeve may be sized and selected to yield the appropriate strength for the application. Similarly, the depth of the two ledges 138, 140 may be sized and selected to yield the appropriate strength for the application.

Figure 4:
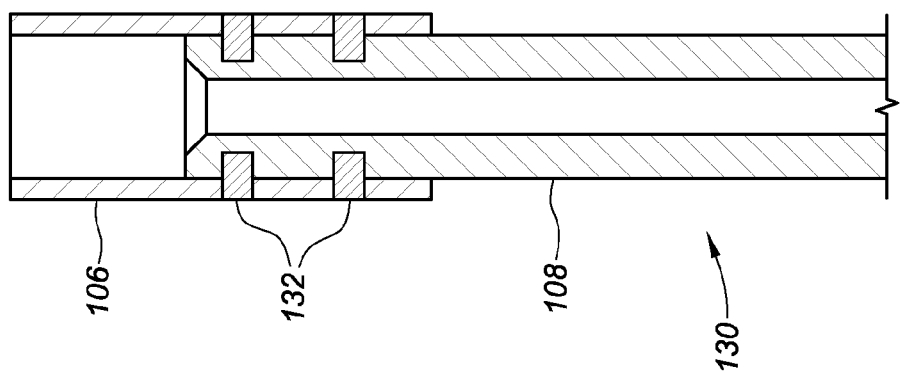
FIG. 4 shows a second alternative downhole tool provided in accordance with aspects of the present disclosure.

FIG. 4 shows an alternative downhole frac or bridge plug 160 in accordance with aspects of the present device, system, and method. In one example, the plug 160 comprises a mandrel 108 comprising a bore 136 and a sleeve 106, which are both made from composite materials. The plug 160 is understood to include other plug components, for example other components discussed above with reference to FIG. 1, but are not shown in FIG. 4 for clarity. As shown, the mandrel 108 incorporates exterior threads 162 designed specifically for composite materials. The sleeve 106 are equipped with similar or corresponding threads 164 for threaded engagement to the threads 162 on the mandrel 108. The threads 162, 164 provide increased shear strength over adhesive bonding only applications by virtue of the threaded engagement along with increased adhesive bond surface area. In other words, in addition to having physical overlapping by virtue of the threads, the threads also provide added surface areas for adhesive bonding. The threads in accordance with aspects of the present device, system, and method are envisioned to be a coarse acme-like thread with a wide base at each thread to maximize the shear strength of the thread itself in composite materials. This coarse acme thread can also be slightly tapered like a conventional pipe thread. It is possible depending on specific operating requirements that adhesive may be omitted, which would add operational flexibility for the tool and its use. By incorporating tapered threads 162, 164, the stress is distributed into multiple layers of the composite laminate used to form the sleeve 106 and the mandrel 108 thereby increasing the connection strength. For example, the threads 162 of the mandrel 108 extend into several laminate layers of the sleeve and the threads 164 of the sleeve 106 extend into several laminate layers of the mandrel to increase the connection strength between the two over connections that only rely on the outer most layers (external for the mandrel and internal for the sleeve) for strength.

Figure 5:
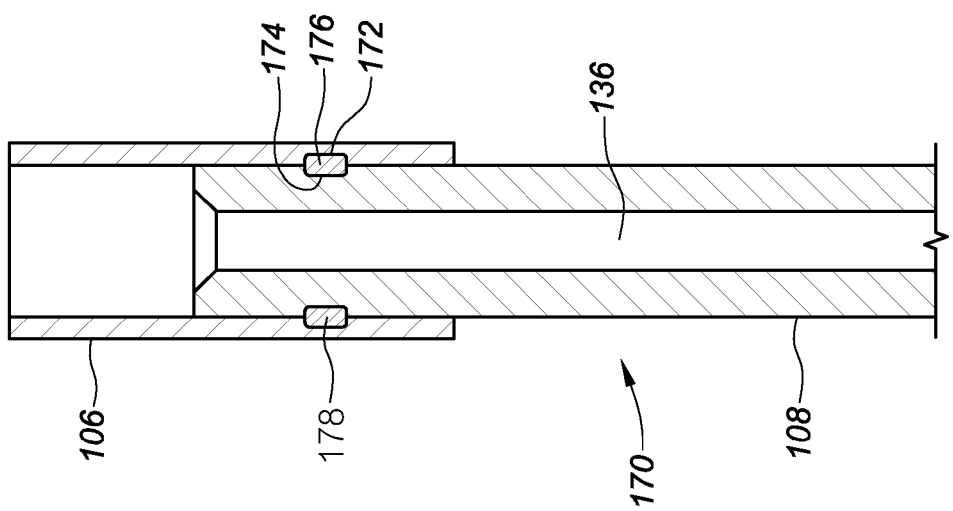
FIG. 5 shows a third alternative downhole tool provided in accordance with aspects of the present disclosure.

FIG. 5 shows an alternative downhole frac or bridge plug 170 in accordance with aspects of the present device, system, and method. In one example, the plug 170 comprises a mandrel 108 comprising a bore 136 and a sleeve 106, which are both made from composite materials. The plug 170 is understood to include other plug components, for example other components discussed above with reference to FIG. 1, but are not shown in FIG. 5 for clarity. As shown, an annular groove 172 is machined into the interior surface of the sleeve 106 and a corresponding annular groove 174 is machined into the exterior surface of the mandrel 108 that together define a common groove 176. In an alternative embodiment, the mandrel used to laminate the sleeve may have a bump or projection so that the annular groove 172 may be formed during fabrication. The bump can be melted away or deformed to remove the sleeve from the assembly. A contracting split ring 178, similar to the letter "C" but with a closer gap, is provided in the common groove 176 to transfer some of the lap shear stress into a bearing stress taken out in both the sleeve 106 and the mandrel 108 at a deeper layer of the laminate. This ring 178 can be made from conventional metallic materials or composite materials. The ring 178 is split so that it can be compressed enough for the sleeve to be slid in place with adhesive. In another example, a second common groove is provided on the plug 170 for receiving a second split ring with additional common grooves and rings contemplated. In yet another example, the common groove is made sufficiently wide to accommodate two or more serially stacked split rings.

Figure 6:
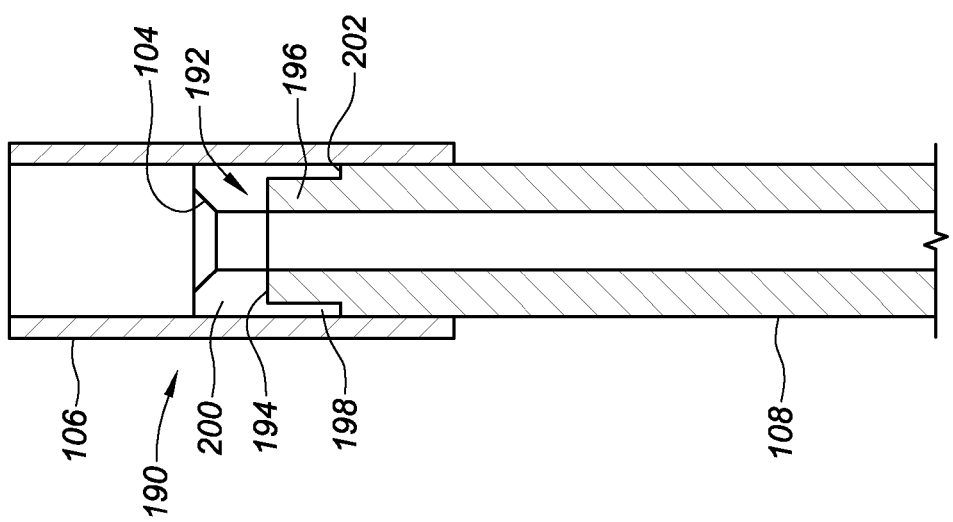
FIG. 6 shows a fourth alternative downhole tool provided in accordance with aspects of the present disclosure.

FIG. 6 shows an alternative downhole frac or bridge plug 190 in accordance with aspects of the present device, system, and method. In one example, the plug 190 comprises a mandrel 108 comprising a bore 136 and a sleeve 106, which are both made from composite materials. The plug 190 is understood to include other plug components, for example other components discussed above with reference to FIG. 1, but are not shown in FIG. 6 for clarity. As shown, a third component, which is a terminal end fitting 192 having a ball seat 104, is positioned on top of the mandrel 106. The mandrel has a reduced tip 196 with a generally flat end 194 for receiving the end fitting 192. The end fitting 192 has a skirt section 198 that extends below the upper crown 200 to define a cavity for receiving the reduced tip 196 on the mandrel. The sleeve 108 is machined with an internal shoulder 202. In an alternative embodiment, the sleeve 108 may be fabricated over a shaft or a mandrel having a raised section for forming the shoulder during fabrication of the sleeve. By way of the reduced tip 196 and the shoulder 202, the mandrel and the sleeve have different inside and outside diameters that will transfer some of the load into deeper layers of the sleeve and mandrel laminates when the assembly is loaded in tension and distribute some of the load in bearing when loaded in compression.

With reference again to the end cap or end fitting 192, it is possible to manipulate the ball seat 104 to form a tight tolerance fit with a frac ball due to its size. For example, the end fitting 192 can be mounted onto a CNC or lathe and machined to a tight tolerance before assembling it onto the mandrel 106. In some examples, the thickness of the end cap 192 can be reduced or adjustable before assembling onto the mandrel so that there is not a significant reduction in bond surface area between the mandrel and the sleeve. The sleeve, end cap, and mandrel may be assembled with adhesive.

Figure 7:
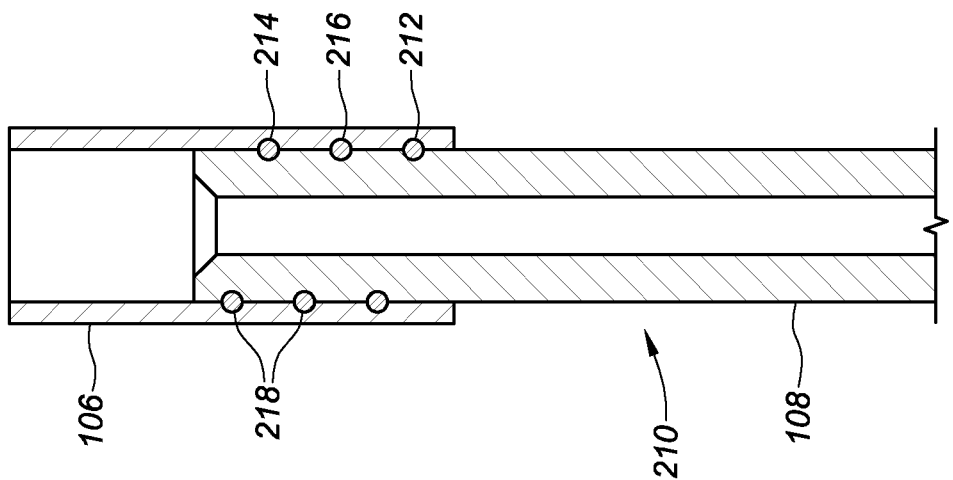
FIG. 7 shows a fifth alternative downhole tool provided in accordance with aspects of the present disclosure.

FIG. 7 shows an alternative downhole frac or bridge plug 210 in accordance with aspects of the present device, system, and method. In one example, the plug 210 comprises a mandrel 108 comprising a bore 136 and a sleeve 106, which are both made from composite materials. The plug 210 is understood to include other plug components, for example other components discussed above with reference to FIG. 1, but are not shown in FIG. 7 for clarity. As shown, an exterior helical spiral groove 212 is machined into the exterior surface of the mandrel 106 and an internal helical spiral groove is machined in the bore of the sleeve. When placed together, the two helical spiral grooves 212, 214 form a complete common helical spiral groove 216. A coiled metallic or non-metallic wire or a combination metallic/non-metallic wire 218 is threaded on to the mandrel and resides in the groove 212. In other words, half of the wire diameter is embedded in the mandrel groove 212 and half of the wire diameter is exposed outside of the mandrel groove 212. The sleeve 108 is then threaded onto the mandrel 106 using the wire 218 as threads. Adhesive is applied to both the mandrel and the sleeve when the two components are threaded together. When the adhesive cures, it locks the sleeve/mandrel and wire assembly together. The wire 218 acts as an additional shear media between the mandrel and the sleeve. The wire 218 also distributes the shear load deeper within the composite laminates of the sleeve and the mandrel so that all the load is not carried just in the adhesive bond. Composite laminate shear (interlaminar shear) strength can be 2-3 times what can be achieved by adhesive bonding using the spiral grooves and wire of the present disclosure.

Although limited embodiments of the of sleeve or coupling to mandrel assemblies and their components have been specifically described and illustrated herein, many modifications and variations will be apparent to those skilled in the art. For example, the various downhole tools may incorporate other components or fewer than the listed components on the mandrel, and the sleeve to mandrel may use a combination of designs disclosed herein, etc. Further, while a pin or multiple connection pins are not required, they may optionally be used in combination with the connection features disclosed herein. Furthermore, it is understood and contemplated that features specifically discussed for one downhole tool embodiment may be adopted for inclusion with another downhole tool embodiment, provided the functions are compatible. Accordingly, it is to be understood that the downhole tool assemblies and their components constructed according to principles of the disclosed device, system, and method may be embodied other than as specifically described herein. The disclosure is also defined in the following claims.

What is claimed is:

1. A composite downhole tool comprising:
   a tubular sleeve comprising an exterior surface and an interior surface defining a sleeve bore, said tubular sleeve being made from a composite material and comprises a plurality laminate layers including an inner most laminate layer defining, at least in part, the bore and an outer most laminate layer defining, at least in part, the exterior surface;
   a mandrel comprising an exterior surface and an interior surface defining a lengthwise bore, said mandrel being made from a composite material and comprises a plurality laminate layers including an inner most laminate layer defining, at least in part, the lengthwise bore and an outer most laminate layer defining, at least in part, the exterior surface;
   a groove formed in the bore of the tubular sleeve and through several layers of the plurality of laminate layers of the tubular sleeve and a groove formed on an exterior of the mandrel and through several layers of the plurality of laminate layers of the mandrel, the groove of the tubular sleeve and the groove of the mandrel aligned to define a common groove having a cavity with an enclosed cross-section with a seam between the inner most laminate layer of the tubular sleeve and the outer most laminate layer of the mandrel; and
   wherein the tubular sleeve is coupled to the mandrel, the inner most laminate layer of the tubular sleeve is bonded to the outer most laminate layer of the mandrel, and a common component that is not a pin is located in the common groove so that at least some of the several laminate layers of the tubular sleeve and of the several laminate layers of the mandrel abut the common component to distribute load across multiple different laminate layers.

2. The composite downhole tool of claim 1, wherein the mandrel comprises a ball seat located within the bore of the tubular sleeve.

3. The composite downhole tool of claim 1, wherein the common component is a split ring.

4. The composite downhole tool of claim 1, wherein the common component is a spiral wire made from a composite, a metal, or a combination thereof.

5. The composite downhole tool of claim 1, wherein the common groove is a first common groove and wherein a second common groove having a common component located therein is provided between the tubular sleeve and the mandrel and spaced from the first common groove.

6. The composite downhole tool of claim 1, wherein the groove on the mandrel is an annular groove.

7. The composite downhole tool of claim 1, wherein the common groove is a common helical spiral groove extending from a first end of the tubular sleeve and partially along a length of the tubular sleeve.

8. The composite downhole tool of claim 1, wherein the common component is a first common component and wherein the common groove is sized and shaped to accommodate a second common component located next to the first common component.

9. The composite downhole tool of claim 1, wherein the groove on the mandrel is a helical groove extending a full circumference of the mandrel and wherein the common component is embedded in the helical groove and part of the common component is exposed outside of the outer most laminate layer of the mandrel.

10. The composite downhole tool of claim 1, further comprising adhesive in the common groove.

11. The composite downhole tool of claim 1, wherein the tubular sleeve has a first end and a second end, said first end surrounding the mandrel and said second end spaced from the mandrel.

12. A method for forming a downhole tool comprising:
    forming a composite tubular sleeve with a plurality of laminate layers, said tubular sleeve comprising an exterior surface and an interior surface defining a sleeve bore;
    forming a cut in the interior surface of the sleeve to form a groove and to expose several laminate layers at the groove but no hole or bore on the exterior surface of the sleeve;
    forming a composite mandrel with a plurality of laminate layers, said composite mandrel comprising an exterior surface and an interior surface defining a lengthwise bore;
    forming a cut on the exterior surface of the mandrel to form a groove and to expose several laminate layers at the groove;
    coupling the sleeve to the mandrel so that the groove of the sleeve and the groove of the mandrel form a common groove having a cavity with an enclosed cross-section with a seam between the interior surface of the sleeve and the exterior surface of the mandrel;
    positioning a common component that is not a pin in the common groove so that at least some of the several laminate layers of the tubular sleeve and of the several laminate layers of the mandrel abut the common component to distribute load across multiple different laminate layers; and
    applying adhesive at the interface between the interior surface of the sleeve and the exterior surface of the mandrel.

13. The method of claim 12, further comprising making a second cut spaced from the cut to form a second groove on the exterior surface of the mandrel.

14. The method of claim 12, wherein the common groove is a common helical spiral groove extending from a first end of the tubular sleeve and partially along a length of the tubular sleeve.

15. The method of claim 14, further comprising placing a helical wire made of a composite, a metal, or a combination of thereof into the common helical spiral groove.

16. The method of claim 12, further comprising attaching an end cap comprising a ball seat to the mandrel and applying adhesive to the end cap and the sleeve.

17. The method of claim 12, wherein the mandrel has a ball seat.

18. The method of claim 12, wherein the common component is a first common component and wherein the common groove is sized and shaped to accommodate a second common component located next to the first common component.

19. The method of claim 12, the groove on the mandrel is a helical groove extending a full circumference of the mandrel and wherein the common component is embedded in the helical groove and part of the common component is exposed outside of the exterior surface of the mandrel.

20. The method of claim 12, wherein tubular sleeve has a first end and a second end, said first end surrounding the mandrel and said second end spaced from the mandrel.

* * * * *

UNITED STATES PATENT AND TRADEMARK OFFICE
CERTIFICATE OF CORRECTION

PATENT NO.         : 9,803,449 B2
APPLICATION NO.    : 13/912074
DATED              : October 31, 2017
INVENTOR(S)        : Frederick A. Good, III et al.

It is certified that error appears in the above-identified patent and that said Letters Patent is hereby corrected as shown below:

In the Specification

In Column 2, Line 42, delete "transfering" and insert -- transferring --, therefor.

In Column 8, Line 9, delete "of the of" and insert -- of the --, therefor.

Signed and Sealed this
Sixth Day of August, 2019

Andrei Iancu
*Director of the United States Patent and Trademark Office*